United States Patent
Andersson et al.

(10) Patent No.: US 11,306,789 B2
(45) Date of Patent: Apr. 19, 2022

(54) ANTI-SQUEAL SHIM

(71) Applicant: Trelleborg Sealing Solutions Kalmar AB, Kalmar (SE)

(72) Inventors: Jonas Karl-Gustaf Andersson, Kalmar (SE); Nils Marcus Olsson, Ljungbyholm (SE); Lars Christian Dahl, Kalmar (SE)

(73) Assignee: Trelleborg Sealing Solutions Kalmar AB, Kalmar (SE)

( * ) Notice: Subject to any disclaimer, the term of this patent is extended or adjusted under 35 U.S.C. 154(b) by 74 days.

(21) Appl. No.: 16/829,305

(22) Filed: Mar. 25, 2020

(65) Prior Publication Data

US 2020/0309208 A1  Oct. 1, 2020

(51) Int. Cl.
| F16D 65/40 | (2006.01) |
| F16D 65/00 | (2006.01) |
| F16D 65/097 | (2006.01) |

(52) U.S. Cl.
CPC ..... F16D 65/0006 (2013.01); F16D 65/0972 (2013.01); *F16D 2200/0004* (2013.01); *F16D 2200/0056* (2013.01)

(58) Field of Classification Search
CPC .......... F16D 65/0971; F16D 65/0006
See application file for complete search history.

(56) References Cited

U.S. PATENT DOCUMENTS

| 3,918,555 A * | 11/1975 | Rath ................ F16D 65/0971 188/73.37 |
| 5,939,179 A * | 8/1999 | Yano ................ B32B 15/06 428/212 |
| 6,213,257 B1 * | 4/2001 | Yano ................ F16D 65/0971 188/73.37 |
| 6,481,545 B1 * | 11/2002 | Yano ................ B32B 15/06 188/264 G |
| 2004/0188190 A1 * | 9/2004 | Niwa ................ F16D 65/0971 188/73.37 |
| 2004/0222055 A1 * | 11/2004 | Niwa ................ F16D 65/0006 188/250 E |
| 2007/0024113 A1 * | 2/2007 | Thrush ............... F16D 66/00 303/155 |
| 2008/0098826 A1 * | 5/2008 | Luthje ............... G01L 1/18 73/862.581 |
| 2010/0140029 A1 * | 6/2010 | Parild ................ F16D 65/0006 188/73.37 |

(Continued)

FOREIGN PATENT DOCUMENTS

| JP | H03125036 | 5/1991 |
| JP | 2013181646 | 9/2013 |

OTHER PUBLICATIONS

Extended European Search Report on corresponding EP application (EP 19165101.7) from EPO dated Sep. 16, 2019.

*Primary Examiner* — Nicholas J Lane
(74) *Attorney, Agent, or Firm* — Klein, O'Neill & Singh, LLP

(57) ABSTRACT

An anti-squeal shim includes at least a first metal layer and an elastomer layer that is bonded to the first metal layer. The at least first metal layer is configured as a first electrode for electrical connection to a resistance measuring system, and the elastomer layer is configured with structural spatial features that enable the elastomer layer to obtain a reduced thickness when subjected to a mechanical force in a direction perpendicular to the elastomer layer.

6 Claims, 4 Drawing Sheets

(56) References Cited

U.S. PATENT DOCUMENTS

2014/0311833 A1* 10/2014 Martinotto .............. G01L 5/225
  188/1.11 E
2019/0003545 A1* 1/2019 Mohseni ................ B05D 3/002

* cited by examiner

ANTI-SQUEAL SHIM

CROSS REFERENCE TO RELATED APPLICATION

This application claims priority, under 35 U.S.C. Section 119, from European Application No. 19165101.7, filed Mar. 26, 2019, the disclosure of which is incorporated herein by reference in its entirety.

FEDERALLY SPONSORED RESEARCH OR DEVELOPMENT

Not applicable.

TECHNICAL FIELD

Embodiments herein relate to an anti-squeal shim and methods for manufacturing such a shim as well as a method of using such a shim in a brake system.

BACKGROUND

In many mechanical systems, simple or more complex systems, there are points at which it is desirable or even essential to gauge the pressure between, e.g., two opposing units in the system. For example, one context where such pressure sensing is of interest is a context where it is desirable to control the pressure with which a first unit is pressed against a second unit that is in motion in order to reduce or stop the motion. An example of such a context is braking in a brake system, e.g., in a vehicle, where the rotational speed of a brake disk is to be regulated. That is, in a brake system it may be desirable to gauge the pressure with which a brake pad is pressing against the brake disk.

Pressure sensing arrangements of various kinds are plentiful in the prior art, and it can be noted that each of these arrangements is typically designed for very narrow fields of application, which in many cases is due to the fact that the pressure sensing arrangements are quite complex in construction and therefore need customizing to the specific field of application. In the particular context of pressure sensing in a brake system, examples of prior art that describe how to gauge the pressure with which a brake pad is pressing against a brake disk include more or less indirect methods or even include theoretical methods. For example, by measuring the pressure of a brake fluid in a brake cylinder in a caliper, a measure of a force with which a brake piston is pressing against a brake disk may be estimated. However, such a method is far from reliable or exact, not least due to the fact that it is an indirect method.

SUMMARY

In view of the above, an object of the present disclosure is to overcome drawbacks related to sensing pressure with which a brake pad is pressing against a brake disk in a brake system.

This object is achieved, in a first aspect, by an anti-squeal shim. Such an anti-squeal shim comprises at least a first metal layer and an elastomer layer that is bonded to the first metal layer. The at least first metal layer is configured as a first electrode for electrical connection to a resistance measuring system, and the elastomer layer is configured with structural spatial features that enable the elastomer layer to obtain a reduced thickness when being subjected to a mechanical force in a direction perpendicular to the elastomer layer.

Such an anti-squeal shim may be arranged, as will be exemplified below, in various contexts involving brake pads where it is of interest to obtain real-time measurements of pressure exerted between a brake pad and, e.g., a caliper. It has been found that, using an elastomer layer that is suitably dimensioned and having suitably combined chemical and mechanical properties as well as suitably adapted voltages and other electric parameters in the resistance measuring system, resistance variations can be measured between the first electrode and a second electrode that is connected to a structure that is pressing on the elastomer layer side, due to variations in the thickness of the elastomer layer. For example, by mixing carbon black into the elastomer during manufacturing, a suitable measure of conductivity can be obtained. The reduction of thickness is facilitated by the fact that the elastomer layer comprises structural spatial features, remembering that an elastomer in general resists being compressed as it has a Poisson ratio close to 0.5. The reduction of the thickness is related to an increase of pressure and thereby is also related to an increase of the applied force. As will be shown, embodiments of such a shim are simple in construction and thus cheap to manufacture, in contrast to prior art devices that are more complex and expensive.

It is to be noted that, although metal is a suitable material for the layer that is configured as the first electrode, any similar material may be used that provides structural rigidity as required by the context in question and electrical characteristics at least similar to those of a metal.

In various embodiments, the structural spatial features may comprise an external surface texture on the elastomer layer. In some embodiments the structural spatial features may comprise a plurality of hollows distributed inside the elastomer layer. For example, such hollows may be a gas that is a remnant of an evaporated liquid or a solid material. In some embodiments, such solid material may have a Poisson ratio that is less than the Poisson ratio of the elastomer layer, and in some embodiments it has an elasticity module that is lower than the elasticity module of the elastomer layer In some embodiments the hollows may comprise microspheres of a polymeric material.

That is, by providing appropriate structures on or inside the elastomer layer, the elastomer layer can be designed to react, in terms of thickness variation, to various levels of pressure and thereby enabling pressure sensing in various contexts, e.g. in terms of physical scale.

In various embodiments, at least one bonding layer comprising a bonding agent provides bonding between the elastomer layer and the at least first metal layer.

In some embodiments, at least a second metal layer is bonded to the elastomer layer whereby the elastomer layer is sandwiched between the first and the second metal layers. Such a second metal layer is thus configured as a second electrode for electrical connection to the resistance measuring system.

Brake pads in a brake assembly are designed to be forced by a structure, e.g., a "finger", of a brake caliper to contact a spinning brake disk and thereby slowing down or stopping the brake disk from spinning. Needless to say, during such a procedure, the forces between the brake pad and the disk, and thereby the pressure, are substantial, and it is often desirable to regulate the forces involved in order to regulate the rate at which the spinning disk is slowed down or to detect and measure vibrations that are generated by varying forces between the brake pad and the disk. By providing an anti-squeal shim as described herein between the pad and the caliper, and connecting the first electrode of the metal layer to a resistance measuring system and connecting a second electrode between, e.g., the caliper and the resistance measuring system, measurements of the pressure and hence the force between the brake pad and the disk are enabled in a very simple and reliable way.

For example, by configuring an electric parking brake, EPB, with a brake pad assembly that comprises an anti-squeal shim as described herein, an improved reliability and a reduced risk of damage to of the EPB can be achieved. An EPB configured with a conventional brake pad assembly typically applies an excessive amount of force on the brake pad assembly in order to compensate for a presumed cooling-induced reduction of spatial dimensions of the brake components. Such a compensating excess of force will inevitably increase the risk of damage or even failure of the brake components. In contrast, by utilizing a brake pad assembly configured with a shim as disclosed herein, it is possible to configure the EPB with a force feedback from the brake pad assembly, thereby enabling the EPB to apply a dynamic force to the brake components, the dynamic force being just enough to secure the brake effect while minimizing the mechanical stress on the brake components.

Another context involves a brake pad assembly is an electromechanical brake system (e.g. so-called "brake-by-wire" systems), where electronic logic circuitry controls the movement of brake pads in relation to brake disks. In order to perform such brake control, the electromechanical brake system uses feedback information from, e.g., sensors in the braking system and other information related to the movement of a vehicle in which the electromechanical brake system is operating. In such a system, feedback information in the form of a pressure, and thereby a force at which a brake pad is pressing against a brake disk, is a vital piece of information. Furthermore, many modern vehicles are also configured with anti-spin functions, traction control functions, and panic-steering functions, where braking is used to steer the vehicle, all of which will benefit from information fed back from the braking system. An anti-squeal shim configured as described herein is capable of providing such vital information for the electromechanical brake system.

Yet another context where control of the force with which a brake pad is applied to a brake disk is the rapidly growing fleet of battery-powered electric vehicles (including so-called hybrid vehicles that are partly powered by an electric motor and battery). Battery powered electric vehicles are typically configured with an electromechanical brake system that comprises both a mechanical system of brake pads and brake disks and an electric brake system that controls the electric motors to act in reverse as generators, thereby slowing down rotation of the wheels of the vehicle while at the same time charging the batteries. It has been noted that such electric vehicles do not apply the mechanical brake system very often and as a consequence of this it has been found that the brake disks of battery powered electric vehicles often become corroded and obtain a more or less thick layer of rust, other oxides, dust, oil, or other undesired coatings picked up and accumulated during use of the vehicle. By providing an anti-squeal shim as described herein in such an electromechanical brake system, a controlled process, i.e. a "conditioning process", of removing such a rust layer from a brake disk can be performed and thereby contribute to a safe use of battery powered electric vehicles.

In another aspect there is provided a method of manufacturing an anti-squeal shim as described herein. Such a method comprises producing an elastomer mixture and producing an elastomer sheet comprising structural spatial features from the elastomer mixture. A sheet of metal is produced and the metal sheet and the elastomer sheet are bonded together. The bonded metal and elastomer sheet is divided into individual anti-squeal shims, wherein the metal layer of each shim is configured as an electrode for electric connection to a resistance measuring system.

In yet another aspect there is provided a brake pad assembly comprising a brake pad and at least one anti-squeal shim as described herein.

In yet another aspect there is provided a brake system comprising at least one caliper, at least one brake disk, and at least one brake pad assembly as described above.

In yet another aspect there is provided a method of measuring pressure between a brake pad and a brake disk in a brake system. The method comprises the steps of arranging an electrical connection between at least one anti-squeal shim comprised in the brake pad assembly and a resistance measuring system. An electrical connection between at least one part of the caliper and the resistance measuring system is also arranged, the at least one part of the caliper being arranged to convey a force to the brake pad through the anti-squeal shim. Movement of the at least one brake pad assembly is controlled such that the at least one brake pad contacts the brake disk, and a resistance value is detected in the resistance measuring system.

Effects and advantages of these further aspects correspond to those summarized above in connection with the first aspect.

DETAILED DESCRIPTION

Figure 1A:
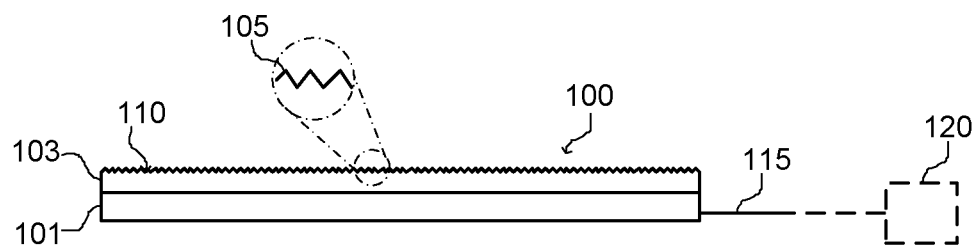
FIG. 1a schematically illustrates a side view of a shim with an elastomer layer having an external surface structure.

Referring to FIGS. 1a-e, an anti-squeal shim 100 comprises at least a first metal layer 101 and an elastomer layer 103 that is bonded to the first metal layer 101. The at least first metal layer 101 is configured as a first electrode for electrical connection to a resistance measuring system 120, and the elastomer layer 103 is configured with structural spatial features 110, 111 that enable the elastomer layer 103 to obtain a reduced thickness, Ti, when being subjected to a mechanical force F in a direction perpendicular to the elastomer layer 103.

Examples of elastomer materials that are suitable as the elastomer layer 103 include rubbers (such as nitrile rubbers, silicone rubbers, natural rubbers and combinations thereof), fluoroelastomers, viscoelastic polymers (such as (meth) acrylic acid-based polymers, (meth)acrylate-based polymers and combinations thereof), viscoelastic adhesives (such as pressure sensitive adhesives (PSA) of the type acrylic, modified acrylic, silicone or rubber based), and plastics. Specific examples of viscoelastic rubber materials include acrylic rubber (ACM), ethylene acrylic elastomer (AEM), bromo butyl rubber (BIIR), butadiene rubber (BR), chloro butyl rubber (CIIR), chlorinated polyethylene rubber (CM), chloroprene rubber (CR), chlorosulphonated polyethylene rubber (CSM), epichlorohydrin rubber (ECO), ethylene propylene diene rubber (EPDM), fluoro rubber (FPM), hydrogenated nitrile rubber (HNBR), butyl rubber (IIR), isoprene rubber (IR), fluoro-silicone rubber (MFQ), nitrile rubber (NBR), natural rubber (NR), propylene oxide rubber (PO), silicone rubber (Q), styrene-butadiene rubber (SBR), urethane rubber (U).

In any case, for a suitable elastomer material, the relationship between the mechanical properties and the electrical properties of the elastomer layer 103 are such that when the material of the elastomer layer is being squeezed, the particles of the material get closer to each other and thereby provide a change of resistance to electric current. For example, by mixing an appropriate amount of carbon black into the elastomer during manufacture, such characteristics may be obtained.

As mentioned above, although metal is a suitable material for the layer 101 that is configured as the first electrode, any similar material may be used that provides structural rigidity as required by the context in question and electrical characteristics at least similar to those of a metal. Examples of metals that are useful include stainless steel, hot dipped galvanized (HDG) steel, carbon steel, aluminum, etc. Other materials include carbon containing materials (such as carbon fiber, graphite and carbon black) and silicon containing materials.

As exemplified schematically in FIGS. 1a, 1b, 1d, 1e, 2a and 2b, the structural spatial features 110 may comprise an external surface texture 110 on the elastomer layer 103. This external surface texture 110 may comprises any of a sawtooth texture, a square-wave texture, a sinusoidal texture, or any other more or less regular or pseudo-random structure that may be obtained by means of, e.g., imprinting, engraving, etching, grinding, or any appropriate machining technique, as will be described further in detail below in connection with a method of manufacturing. The side view of FIG. 1a and the top view of FIG. 1b exemplify an antisqueal shim 100 where the external surface texture 110 is a saw-tooth texture having a plurality of saw-tooth shaped texture units 105 configured in a matrix distribution in the external surface texture 110.

Needless to say, the notation "side" view and "top" view are not to be interpreted in a restrictive way since, as the skilled person will realize, the orientation of shims when used may vary to a great extent, and the concept of "top" or "side" depend on the actual context of use.

Figure 1B:
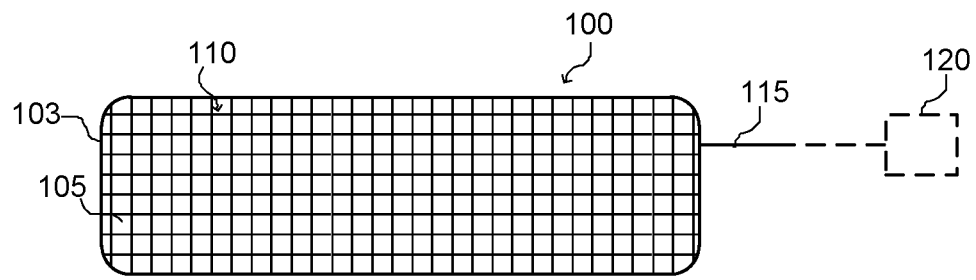
FIG. 1b schematically illustrates a top view of a shim with an elastomer layer having an external surface structure.
Figure 1C:
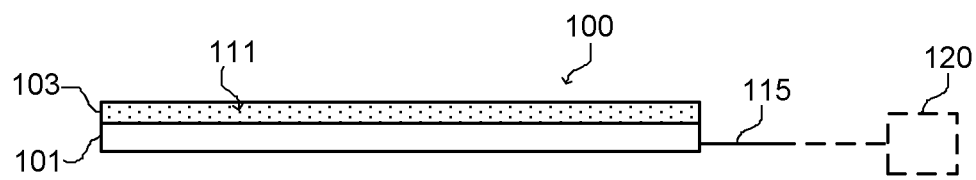
FIG. 1c schematically illustrates a side view of a shim with an elastomer layer having internally distributed hollows.
Figure 1D:
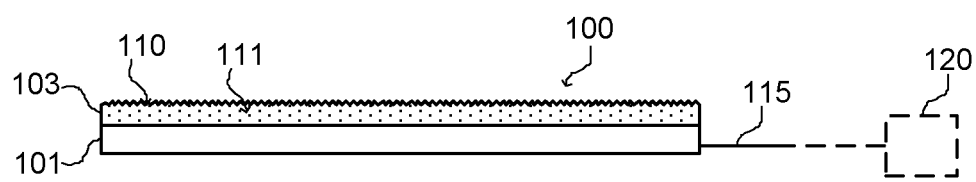
FIG. 1d schematically illustrates a side view of a shim with an elastomer layer having an external surface structure and internally distributed hollows.

As illustrated schematically in FIGS. 1c and 1d, the structural spatial features 110 may, also or alternatively, comprise a plurality of hollows 111 distributed inside the elastomer layer 103. Such hollows 111 may contain a gas that is a remnant of an evaporated liquid. Such hollows 111 comprising gas may be obtained by means of mixing a proving substance such as bicarbonate of soda into the elastomer during manufacturing, as will be described further in detail below in connection with a method of manufacturing. In some embodiments, the hollows 111 may comprise solid material, the solid material having a Poisson ratio that is less than the Poisson ratio of the elastomer material in the elastomer layer 103 and/or an elasticity module that is less than that of the elastomer material in the elastomer layer 103. An example of such material is cork. Such solid material of the hollows may be incorporated in the elastomer layer 103 during the process of manufacturing, as will be exemplified below. Furthermore, in some embodiments, the hollows may comprise microspheres of a polymeric material. As will be described below, such microspheres may be incorporated in the elastomer layer by mixing during the process of manufacturing the elastomer layer 103.

Figure 1E:
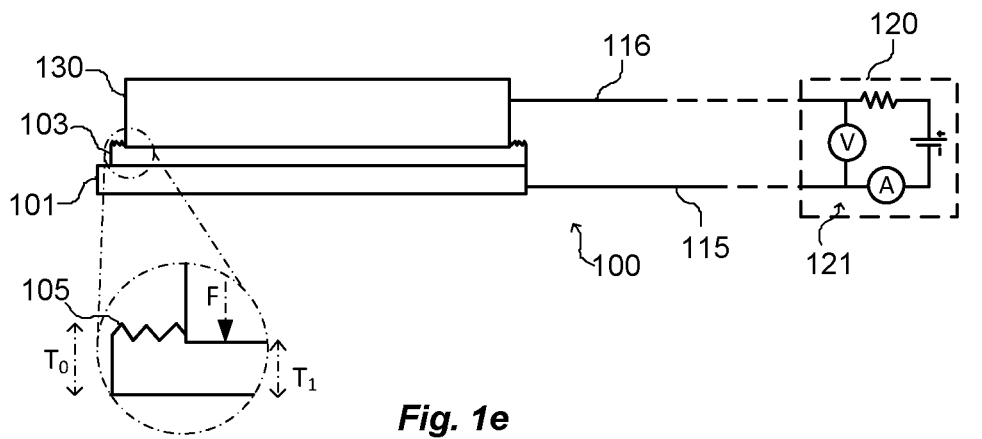
FIG. 1e schematically illustrates a side view of a shim being subject to a mechanical force.

FIG. 1e illustrates schematically how the elastomer layer 103 may obtain a reduced thickness, Ti, when being subject to a mechanical force F, applied by a force applying arrangement 130, in a direction perpendicular to the elastomer layer 103. When the force F is applied, the texture units 105 become compressed and, as discussed above, a reduced resistance may be determined by means of the resistance measuring system 120.

With regard to the first metal layer 101 being configured as a first electrode for electrical connection to the resistance measuring system 120, a simple configuration is illustrated in FIGS. 1a-e where an electrical connector 115 is attached, e.g. via any appropriate connector means, to the resistance measuring system 120.

With regard to the resistance measuring system 120, the skilled person will realize that it may be any appropriate circuitry capable of determining a voltage and a current, as exemplified by circuitry 121 in FIG. 1d. The resistance measuring system 120 is connected to the metal layer 101 of the shim 100 and the force-applying arrangement 130 via respective connectors 115, 116. That is, a closed electric circuit is created in that a connector 116 connects an electrically conductive part of the force-applying arrangement 130 being in contact with the elastomer layer 103 to the resistance measuring system 120.

It is to be noted that the embodiments described in the present disclosure may, as an alternative to the resistance measuring system 120, use a more generic impedance measuring system. For example, the elastomer layer 103 exhibits a variation in capacitance when being reduced in thickness due to an applied mechanical force. Hence, in an impedance measuring system, the capacitive impedance may then be used as a measure of force instead of resistance. Furthermore, it is to be noted that elastomer materials suitable for the elastomer layer 103 have a piezo-resistive character, which provides a relation between applied force and resistance similar to the situation where particles of the material get closer to each other and thereby provide a change of resistance to electric current.

Figure 2A:
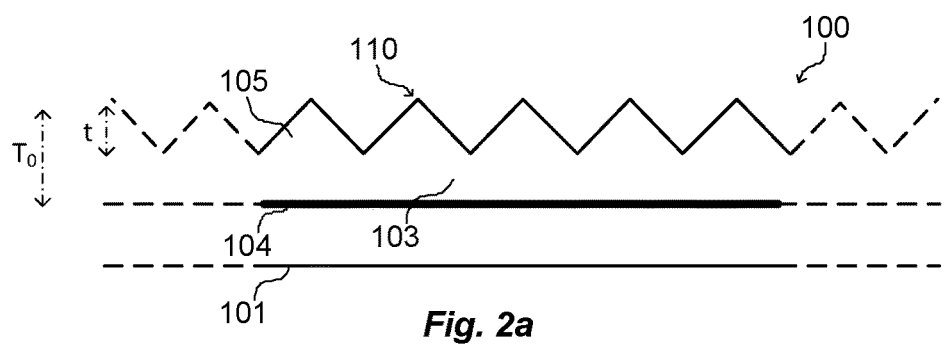
FIGS. 2a and 2b schematically illustrate a respective side view of a shim comprising a bonding layer.

As exemplified in FIG. 2a, at least one bonding layer 104 comprising a bonding agent may provide bonding between the elastomer layer 103 and the at least first metal layer 101. Suitable examples of materials in such a bonding layer 104 include a mixture of phenol, a polymer, and carbon black. It is to be noted that the bonding layer 104 may be very thin; in fact examples of a typical thickness may be in the range 1-10 μm. Examples of specific materials that are suitable for use in the bonding layer 104 include materials provided by Lord Corporation under the trademark Chemlok® and materials provided by Dow Chemical under the trademarks Thixon® and Megum®.

FIG. 2a also illustrates an example of spatial dimensions of the external surface texture 110 having a thickness t, whereas the total thickness of the external surface texture 110 is $T_0$. Furthermore, FIG. 2a illustrates that the external surface texture 110 comprises a number of texture units 105 that have a saw-tooth shape similar to the texture units 105 in the example of FIG. 1a and FIG. 1b.

Figure 2B:
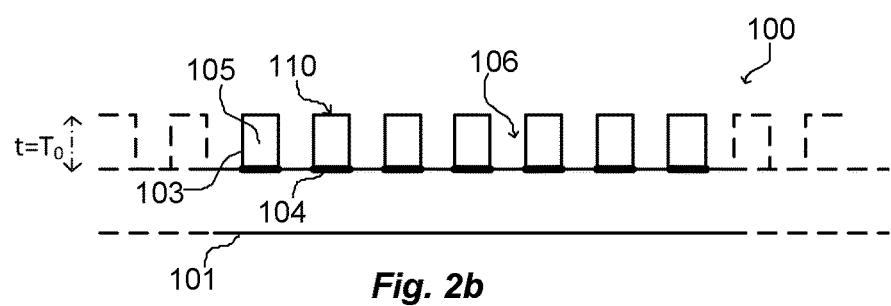

As exemplified in FIG. 2b, the external surface texture 110 of the elastomer layer 103 may be in the form of a square-wave texture. In this example, the square-wave texture comprises a plurality of texture units 105 separated by a respective spacing 106, the texture units 105 having a thickness t, which is equal to the total thickness $T_0$ of the external surface texture 110. In other words, the texture units 105 of the anti-squeal shim 100 exemplified in FIG. 2b form small individual "islands", each "island" being individually bonded by a piece of bonding layer 104 to the metal layer 101. Although not illustrated, the texture units 105 may have other cross-section shapes, for example triangular shape, truncated pyramid shape, etc.

As the skilled person will realize, a respective top view of the embodiments of an anti-squeal shim 100 that are schematically illustrated in the side views of FIGS. 2a and 2b would correspond to the top view of the embodiments of the anti-squeal shim 100 schematically illustrated in the top view of FIG. 1b. That is, in a top view of the shim illustrated in FIGS. 2a and 2b, the texture units 105 would be illustrated as configured in a matrix distribution in the external surface texture 110.

Figure 3:
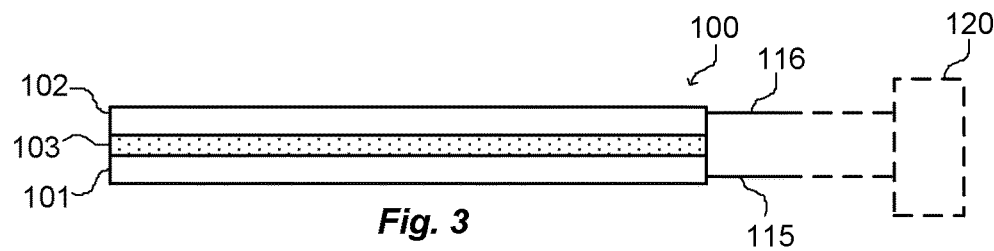
FIG. 3 schematically illustrates a side view of a shim comprising two metal layers.

As exemplified in FIG. 3, an anti-squeal shim 100 may comprise at least a second metal layer 102 bonded to the elastomer layer 103, whereby the elastomer layer 103 is sandwiched between the first and the second metal layers 101, 102. Such a second metal layer 102 may be configured as a second electrode for electrical connection to the resistance measuring system 120 as indicated by a second connector 116 being connected to the second metal layer 102. Although FIG. 3 exemplifies the elastomer layer 103 as a layer comprising hollows, it is to be understood that various embodiments of a sandwich shim 100 as illustrated in FIG. 3 may comprise an elastomer layer 103 having an external surface texture 110 and/or a plurality of hollows 111.

Embodiments of a shim 100 as exemplified in FIG. 3 may be used in a situation where, in contrast to the situation exemplified in FIG. 1e, a force applying arrangement does not have the capability of conducting electric current to the resistance measuring system 120.

Figure 4:
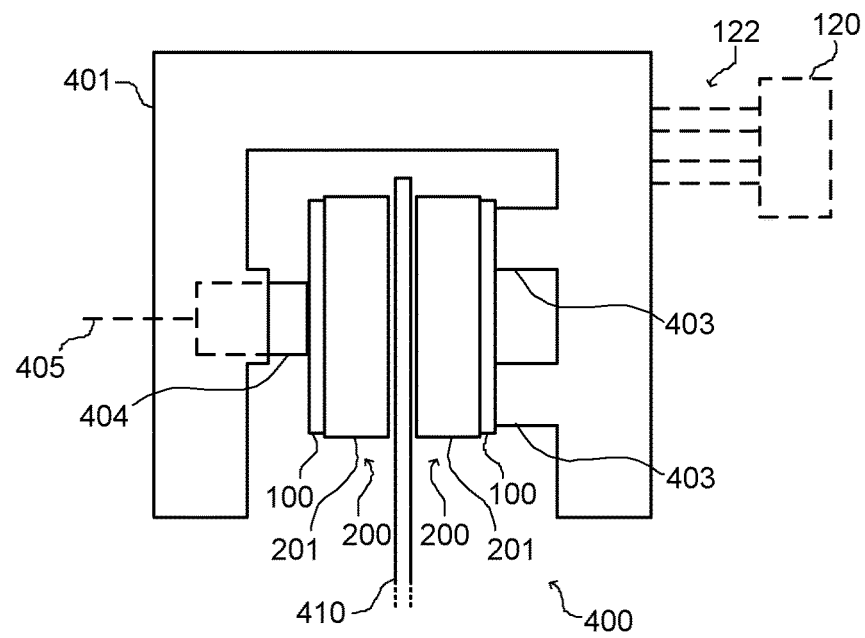
FIG. 4 schematically illustrates a brake system.
Figure 5A:
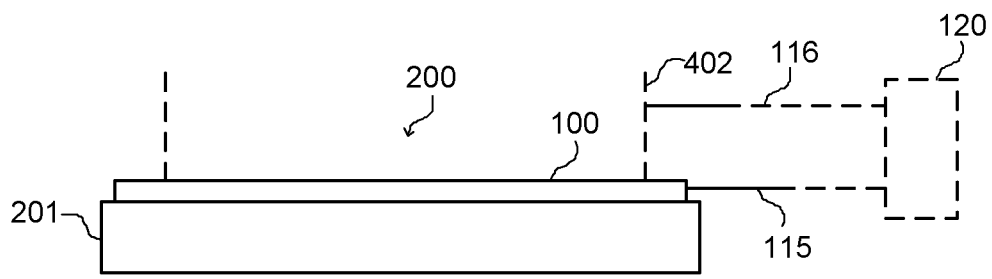
FIGS. 5a and 5b schematically illustrate a respective side view of a brake pad assembly.
Figure 5B:
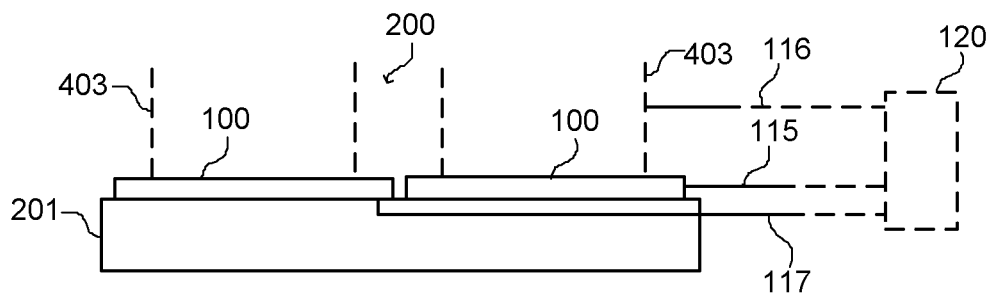

Turning now to FIGS. 4 and 5a-b, use of an anti-squeal shim 100 in connection with a brake pad assembly 200 and a brake system 400 will be described. Such a brake pad assembly 200 comprises a brake pad 201 and at least one anti-squeal shim 100 as described herein.

A brake system 400 comprises at least one caliper 401, at least one brake disk 410 and at least one brake pad assembly 200 that comprises an anti-squeal shim 100 as described herein. The caliper 401 comprises fingers 403 and a piston 404 configured as force applying arrangements for applying brake force upon respective shim 100 comprised in brake pad assemblies 200 acting upon the brake disk 410. As the skilled person will recognize, the caliper 401 exemplified in FIG. 4 is a so-called floating caliper due to the fact that braking force is provided by brake fluid via a brake line 405 to the piston 404. However, the use of anti-squeal shim 100 as exemplified herein may be used also in so-called fixed calipers that are configured with opposing pistons. As the skilled person will realize, the brake system 400 is only one example of a brake system, and other examples of brake systems include those having other numbers of fingers and pistons, depending on, e.g., which size or type of vehicle in which the brake system is configured to be arranged. Moreover, other examples of brake systems are configured such that the piston(s) is actuated, not by means of a hydraulic brake line, but instead by means of electromechanical actuators.

A resistance measuring system 120 is indicated schematically in FIG. 4, and electrical connectors 122 are indicated. The electrical connectors 122 are arranged in relation to the caliper 401 in an appropriate manner and connect the shims 100 and force applying arrangements to the resistance measuring system 120. Such arrangement may, e.g., be realized by use of suitably configured cables within the structure of the caliper 401, the details of which are outside the scope of the present disclosure.

FIG. 5a illustrates schematically a side vide of a brake pad assembly 200 comprising a brake pad 201 and an anti-squeal shim 100. The shim 100 is attached to the brake pad 201 by means of more or less simple mechanical means, such as bending tabs, rivets etc., typically in combination with a glue or pressure sensitive adhesive (PSA). Also indicated in FIG. 5a is a part of a force-applying arrangement 402 that may be, e.g. a finger of a caliper as illustrated in FIG. 4. A resistance measuring system 120 is indicated schematically, and electrical connectors 115, 116 connect the shim 100 and the force-applying arrangement 402, respectively, to the resistance measuring system 120.

FIG. 5b illustrates schematically a side view of a brake pad assembly 200 comprising a brake pad 201 and two anti-squeal shims 100. The shims 100 are attached to the brake pad 201 by means of more or less simple mechanical means, such as bending tabs, rivets etc., typically in combination with a glue or pressure sensitive adhesive (PSA). Also indicated in FIG. 5b is a part of a force-applying arrangement 403 that may be, e.g., a finger of a caliper as illustrated in FIG. 4. A resistance measuring system 120 is indicated schematically, and electrical connectors 115, 116, 117 connect the shims 100 and the force-applying arrangement 403, respectively, to the resistance measuring system 120. Such a brake pad assembly 200, comprising two shims 100 arranged side by side on the brake pad 201, enables measurement of resistance value variations, and thereby force variations, at two separate areas of the brake pad 201, the separate areas being associated with the location of a respective shim 100 in relation to the brake pad 201. This is advantageous in that it provides a direct way of measuring vibrations in the assembly 200, the effects of which may be detrimental to a brake disk with which the brake pad assembly 200 interacts.

Figure 6A:
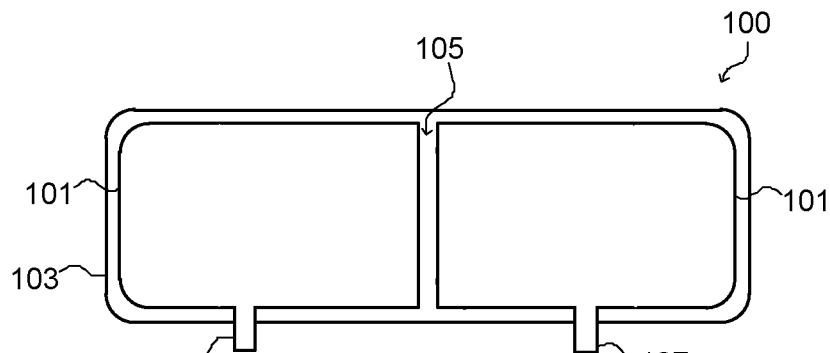
FIGS. 6a and 6b schematically illustrate a respective top view of a shim.

FIG. 6a is a top view that schematically illustrates an anti-squeal shim 100 comprising two metal layers 101, separated by a gap 105, bonded to an elastomer layer 103, e.g., as described above in connection with FIGS. 1 to 3. The metal layers 101 may be configured as electrodes for electrical connection to a resistance measuring system (not shown in FIG. 6a), as indicated by a respective metal tab 125, 127. It is to be noted that the spatial extent, in two dimensions as viewed from above in FIG. 6a, of the metal layers 101 may be different than that illustrated. For example, the spatial extent of the two metal layers 101 may be such that they cover all of the spatial extent of the elastomer layer 103, leaving just a very small gap 105 for electrical isolation between the respective metal layers 101. Such a shim 100 may, e.g., be used in connection with a brake pad assembly 200 as exemplified above in connection with FIG. 5b. The metal tabs 125, 127 may then connect the metal layers 101 with respective electrical connectors 115, 117 and thereby connect the shim 100 to a resistance measuring system (not illustrated in FIG. 6a).

Figure 6B:
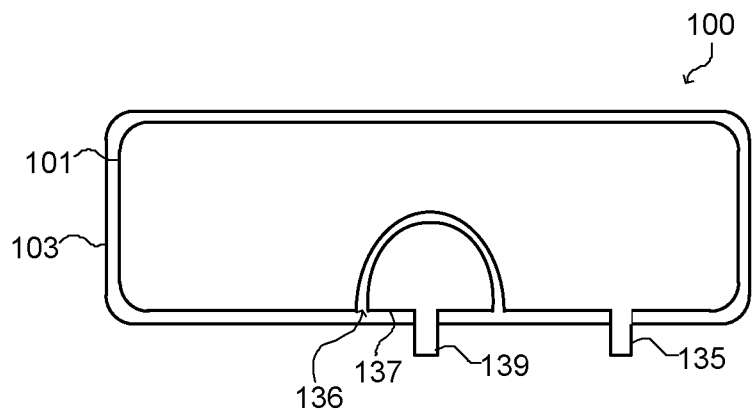

FIG. 6b is a top view that schematically illustrates an anti-squeal shim 100 comprising two metal layers 101 and 137, separated by a gap 136, bonded to an elastomer layer 103, e.g., as described above in connection with FIGS. 1 to 3. The metal layers 101, 137 may be configured as electrodes for electrical connection to a resistance measuring system (not shown in FIG. 6b), as indicated by metal tabs 135 and 139. Such a shim 100 may, e.g., be used in connection with a brake pad assembly 200 similar to the assemblies exemplified above in connection with FIGS. 5a and 5b where a piston 404 or fingers 403 of a brake caliper apply force at an area of the shim 100 that does not include the metal layer 137. Such an arrangement provides an additional advantage in that the metal layer 137 may be connected, via the tab 139, to a resistance measuring system that also detects a resistance value associated with an area of the shim 100 that is not being subject of an applied force, and such a resistance value may be used to calibrate resistance values measured via metal layer 101. For example, in a brake pad assembly context, there may be very large temperature variations, and in such situations resistance values obtained via the metal layer 137, not being subject of an applied force, may be considered as a temperature-compensating resistance value and thereby enable provision of a more exact measurement of the applied force. Moreover, in various contexts it may be of interest to have knowledge about the temperature as such in a brake pad assembly.

Similar to the example of FIG. 6a, it is to be noted that the spatial extent, in two dimensions as viewed from above in FIG. 6b, of the metal layers 101, 137, may be different than that illustrated. For example, the spatial extent of the two metal layers 101, 137 may be such that they cover all of the spatial extent of the elastomer layer 103, leaving just a very small gap 136 for electrical isolation between the respective metal layers 101, 137.

Figure 7:
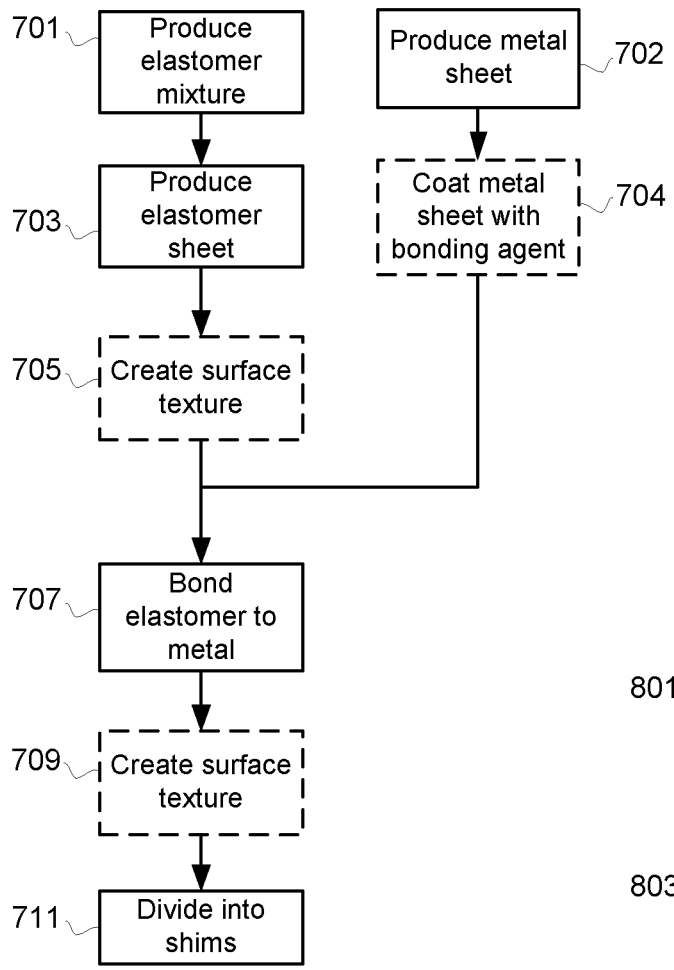
FIG. 7 is a flowchart of a method of manufacturing an anti-squeal shim.

Turning now to FIG. 7, a method of manufacturing an anti-squeal shim, e.g., a shim 100 as exemplified and described above in connection with FIGS. 1 to 6, will be described in some detail. The method comprises the following steps:

Step 701

Components of an elastomer are mixed and thereby producing the elastomer that is to be produced into the elastomer layer 103 described herein. Structural spatial features in the form of a plurality of hollows 111, as exemplified above, may be created during this step by way of inclusion in the mixture of a proving substance such as bicarbonate of soda, which creates gas filled hollows during heat treatment or vulcanization. Alternatively, structural spatial features in the form of a plurality of hollows 111 comprising solid material as exemplified above may be created during this step by inclusion in the mixture of solid material having a Poisson ratio that is less than the Poisson ratio of the elastomer material in the elastomer layer 103 and/or an elasticity module that is less than that of the elastomer material in the elastomer layer 103.

Step 703

A sheet of elastomer is then produced from the elastomer mixture produced in step 701. The sheet may be produced in various ways. For example, the elastomer mixture may be subject to calendaring and, optionally, rolled into a roll. The elastomer mixture may alternatively be dissolved in a solvent and then, during step 707 that follows, be spread directly onto a metal sheet. The elastomer mixture created in step 701 may alternatively be divided into particles and spread onto the metal sheet and compression-molded during step 707 that follows.

An alternative way of producing hollows comprising solid material is to, subsequent to step 703, sprinkle a sheet of elastomer with pieces of the solid material, which during step 707 becomes included into the elastomer layer.

Step 705

In this optional step, structural spatial features 110 in the form of an external surface texture as exemplified above may be created. For example, the surface texture may be created by imprinting the elastomer sheet with a structured roll or other surface. The texture may also be created by engraving, e.g. by laser, grinding or milling etc.

Step 702

A metal sheet is created. This step may be performed concurrently or independent of the step of producing the elastomer sheet in steps 701 to 705.

Step 704

In this optional step, the metal sheet is then covered with a bonding agent.

Step 707

The metal sheet and the sheet of elastomer is then bonded together by way of a process that may involve heat and/or pressure. For example, compression molding may take place as mentioned above, and vulcanization of the elastomer may take place during this step, during which the elastomer becomes bonded to the metal. As mentioned above, during this step, in some embodiments, pieces of solid material may be sprinkled on the elastomer prior to vulcanization. Such sprinkled pieces will then become included in the elastomer layer, thereby forming solid material filled hollows as exemplified above.

Step 709

Similar to the optional step 705, in this optional step, the structural spatial features 110 in the form of an external surface texture as exemplified above may be created.

Step 711

The bonded coil of metal sheet and elastomer sheet is then divided into individual shims that comprise a metal layer and an elastomer layer as exemplified above. For example, during this dividing step, the metal layer may, e.g., be stamped, cut, laser cut, milled, or sawed with a spatial shape that comprises an electrode for electrical connection to a resistance measuring system.

An optional way of producing an elastomer sheet having external texture is to injection mold or compression mold an elastomer material, using a mold having an internal surface that comprises a desired texture that, during the molding process, imprints the desired texture onto the surface of the elastomer sheet.

The manufacturing method described herein may comprise an alternative sequence of steps where the metal sheet is divided into individual components, each of which is subsequently covered by the elastomer layer 103 by way of injection molding or compression molding.

Figure 8:
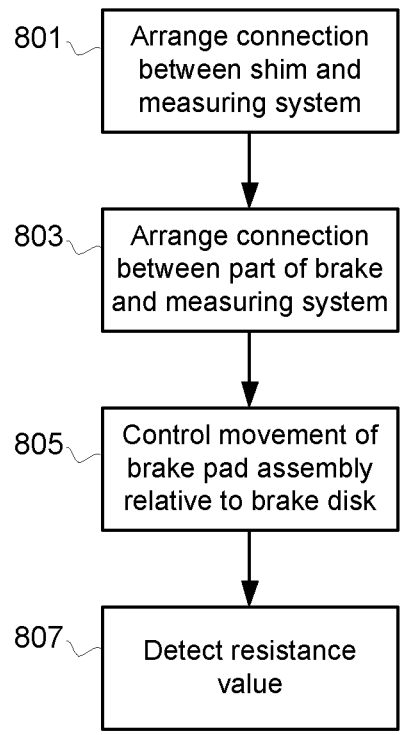
FIG. 8 is a flowchart of a method of measuring pressure using an anti-squeal shim.

Turning now to FIG. 8, and with continued reference to FIGS. 4 and 5a, a method of measuring pressure between a brake pad assembly 201 and a brake disk 410 in a brake system 400 will be described in some detail. The method comprises the following steps:

Step 801

An electrical connection is arranged between at least one anti-squeal shim 100 comprised in the brake pad assembly 200 and a resistance measuring system 120.

Step 803

An electrical connection is arranged between at least one part of the brake system 400 and the resistance measuring system 120. The at least one part of the brake system is arranged to convey a force to the brake pad 201 through the anti-squeal shim 100. For example, the at least one part of the brake system 400 may be the piston 404 or a finger 403.

Step 805

Movement of the at least one brake pad assembly 200 is controlled such that the at least one brake pad 201 contacts the brake disk 410.

Step 807

Detection of a resistance value is made in the resistance measuring system 120, during the controlled movement of the brake pad assembly 200.

The resistance value, or values, obtained in step 807 may then be used as a measure of the force with which the brake pad presses against the disk 410. Such a measure of force may then be logged and utilized in subsequent analysis of, e.g., dynamic characteristics of the brake system 400. However, a description of such utilization is outside the scope of the present disclosure.

What is claimed is:

1. An anti-squeal shim, comprising:
a metal layer; and
an elastomer layer that is bonded to the metal layer;
wherein the metal layer is configured as a first electrode electrically connectable to a resistance measuring system; and
wherein the elastomer layer is configured with structural spatial features that comprise a plurality of hollows containing a gas that is a remnant of an evaporated liquid, the hollows being distributed inside the elastomer layer and configured to enable the elastomer layer to obtain a reduced thickness ($T_1$) when being subject to a mechanical force (F) in a direction perpendicular to the elastomer layer.

2. The anti-squeal shim of claim 1, further comprising a bonding layer including a bonding agent that provides chemical bonding between the elastomer layer and the metal layer.

3. The anti-squeal shim of claim 1, wherein the metal layer is a first metal layer configured as a first electrode electrically connectable to the resistance measuring system, the anti- squeal shim further comprising a second metal layer bonded to the elastomer layer, whereby the elastomer layer is sandwiched between the first and the second metal layers, the second metal layer being configured as a second electrode electrically connectable to the resistance measuring system.

4. A method of manufacturing anti-squeal shims, comprising the steps of:
producing an elastomer sheet from an elastomer mixture, the elastomer sheet comprising structural spatial features that comprise a plurality of hollows inside the elastomer sheet that contain a gas that is a remnant of an evaporated liquid;
bonding a metal sheet to the elastomer sheet; and
dividing the bonded metal sheet and elastomer sheet into individual anti-squeal shims, each of the anti-squeal shims comprising a metal layer and an elastomer layer;
wherein the metal layer of each anti-squeal shim is configured as an electrode that is electrically connectable to a resistance measuring system.

5. A brake system, comprising:
a caliper;
a brake pad assembly operably attached to the caliper, the brake pad assembly comprising:
a brake pad; and
an anti-squeal shim attached to the brake pad, the anti-squeal shim comprising:
a metal layer; and
an elastomer layer that is bonded to the metal layer;
wherein the metal layer is configured as a first electrode electrically connectable to a resistance measuring system; and
wherein the elastomer layer is configured with structural spatial features that comprise a plurality of hollows containing a gas that is a remnant of an evaporated liquid, the hollows being distributed inside the elastomer layer and configured to enable the elastomer layer to obtain a reduced thickness ($T_1$) when being subject to a mechanical force (F) in a direction perpendicular to the elastomer layer;
and
a brake disk positioned to be engaged by the brake pad assembly.

6. An anti-squeal shim, comprising:
a metal layer; and
an elastomer layer that is bonded to the metal layer;
wherein the metal layer is configured as a first electrode electrically connectable to a resistance measuring system; and
wherein the elastomer layer is configured with structural spatial features that comprise a plurality of hollows distributed inside the elastomer layer, the hollows comprising microspheres of a polymeric material, the hollows being configured to enable the elastomer layer to obtain a reduced thickness ($T_1$) when being subject to a mechanical force (F) in a direction perpendicular to the elastomer layer.

\* \* \* \* \*

UNITED STATES PATENT AND TRADEMARK OFFICE
CERTIFICATE OF CORRECTION

PATENT NO. : 11,306,789 B2
APPLICATION NO. : 16/829305
DATED : April 19, 2022
INVENTOR(S) : Andersson et al.

It is certified that error appears in the above-identified patent and that said Letters Patent is hereby corrected as shown below:

On the Title Page

In between item (65) and (51), insert:
--(30) Foreign Application Priority Data
Mar. 26, 2019 (EP)..........................19165101--

Signed and Sealed this
Fourteenth Day of June, 2022

Katherine Kelly Vidal
*Director of the United States Patent and Trademark Office*